United States Patent
Wang

(10) Patent No.: US 9,671,848 B2
(45) Date of Patent: Jun. 6, 2017

(54) REDUNDANT POWER SUPPLY CIRCUIT, POWER OVER ETHERNET SYSTEM, AND METHOD

(71) Applicant: HON HAI PRECISION INDUSTRY CO., LTD., New Taipei (TW)

(72) Inventor: Yi-Feng Wang, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 571 days.

(21) Appl. No.: 14/207,667

(22) Filed: Mar. 13, 2014

(65) Prior Publication Data

US 2014/0361608 A1 Dec. 11, 2014

(30) Foreign Application Priority Data

Jun. 11, 2013 (TW) .............................. 102120786 A

(51) Int. Cl.
| | |
|---|---|
| *G06F 1/26* | (2006.01) |
| *H04L 12/40* | (2006.01) |
| *H04L 12/10* | (2006.01) |

(52) U.S. Cl.
CPC .............. *G06F 1/266* (2013.01); *H04L 12/10* (2013.01); *H04L 12/40045* (2013.01)

(58) Field of Classification Search
CPC ... H04L 12/40; H04L 12/40045; H04L 12/10; G06F 1/26; G06F 1/266
See application file for complete search history.

(56) References Cited

U.S. PATENT DOCUMENTS

| | | | | |
|---|---|---|---|---|
| 8,935,543 | B2* | 1/2015 | Hunter, Jr. .............. | H04L 12/10 307/18 |
| 9,024,473 | B2* | 5/2015 | Huff ........................ | G06F 1/266 307/52 |
| 2013/0117585 | A1 | 5/2013 | Chen et al. | |

FOREIGN PATENT DOCUMENTS

| | | |
|---|---|---|
| CN | 101124771 | 2/2008 |
| CN | 101124771 A | 2/2008 |
| CN | 101594236 | 12/2009 |
| CN | 102025509 | 4/2011 |
| CN | 102215113 | 10/2011 |
| CN | 102215113 A | 10/2011 |

* cited by examiner

*Primary Examiner* — Ryan Johnson
(74) *Attorney, Agent, or Firm* — Steven Reiss

(57) ABSTRACT

A redundant power supply circuit includes a port detection circuit, a fixed state detection circuit, a voltage conversion circuit, and a control circuit. The port detection circuit detects and outputs a plurality of ready signals according to a plurality of power signals of a number of POE ports. The fixed state detection circuit outputs first control signals according to a predetermined voltage signal of a network device. The control circuit generates and sends enable signals to the voltage conversion circuit according to the first control signals and the plurality of ready signals. The voltage conversion circuit converts the plurality of power signals into driving voltage signals according to the enable signals. A POE system and method are also provided.

27 Claims, 13 Drawing Sheets

US 9,671,848 B2

REDUNDANT POWER SUPPLY CIRCUIT, POWER OVER ETHERNET SYSTEM, AND METHOD

BACKGROUND

1. Technical Field

The disclosure relates to redundant power supply circuits, and particularly to a redundant power supply circuit used in a power over Ethernet (POE) system and method.

2. Description of Related Art

When a network device experiences power outages, the network device needs a redundant power module to supply electric signals to avoid data loss. Currently, input voltage signals of the redundant power module are transmitted from an external alternating current (AC) power system. Thus, one type of redundant power module corresponds to one type of network device, and different types of network devices need different types of redundant power modules. Therefore, there is a need for a redundant power supply circuit that can overcome the described limitations.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one."

Figure 1:
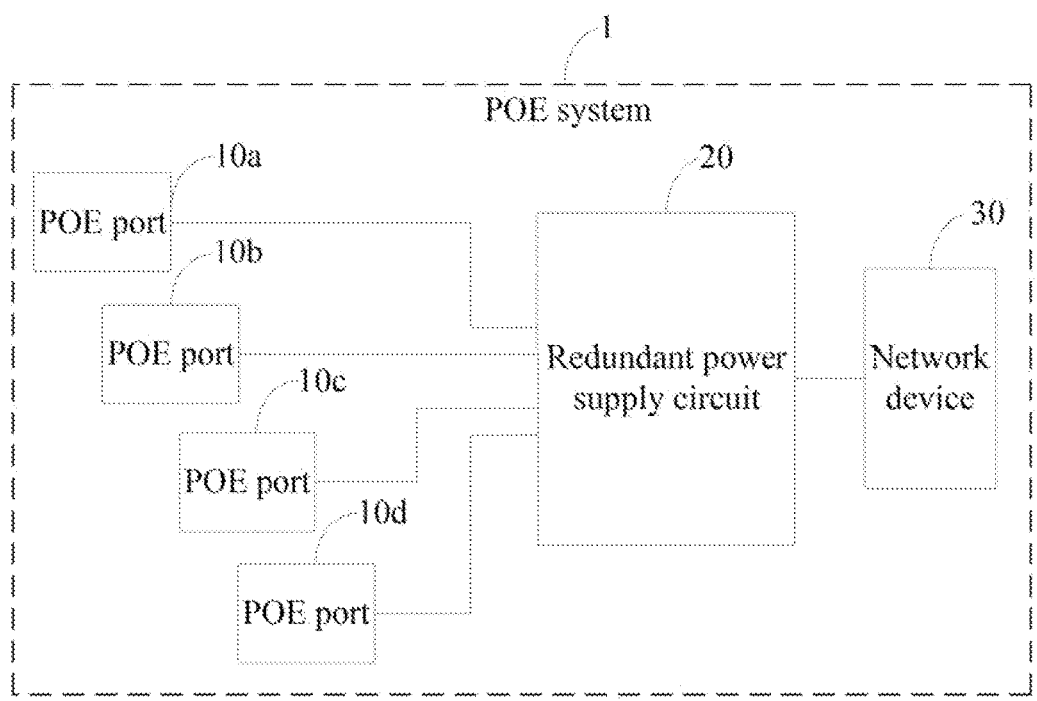
FIG. 1 is a schematic diagram of a first embodiment of a POE system. The POE system comprises a redundant power supply circuit.

FIG. 1 is a schematic diagram of a first embodiment of a POE system 1. In one embodiment, the POE system 1 comprises a plurality of POE ports, such as a POE port 10a, a POE port 10b, a POE port 10c, and a POE port 10d, a redundant power supply circuit 20, and a network device 30. The redundant power supply circuit 20 drives the network device 30 with the POE ports 10a, 10b, 10c, 10d in parallel.

In one embodiment, the POE ports 10a, 10b, 10c, 10d are connected to the network device 30 in parallel, and the POE ports 10a, 10b, 10c, 10d are connected to a power sourcing equipment (PSE) to gain power signals via a plurality of RJ45 cables. In other embodiments, the POE ports 10a, 10b, 10c, 10d can be set in the PSE, and the POE ports 10a, 10b, 10c, 10d and the redundant power supply circuit 20 can also be set in the network device 30.

Figure 2:
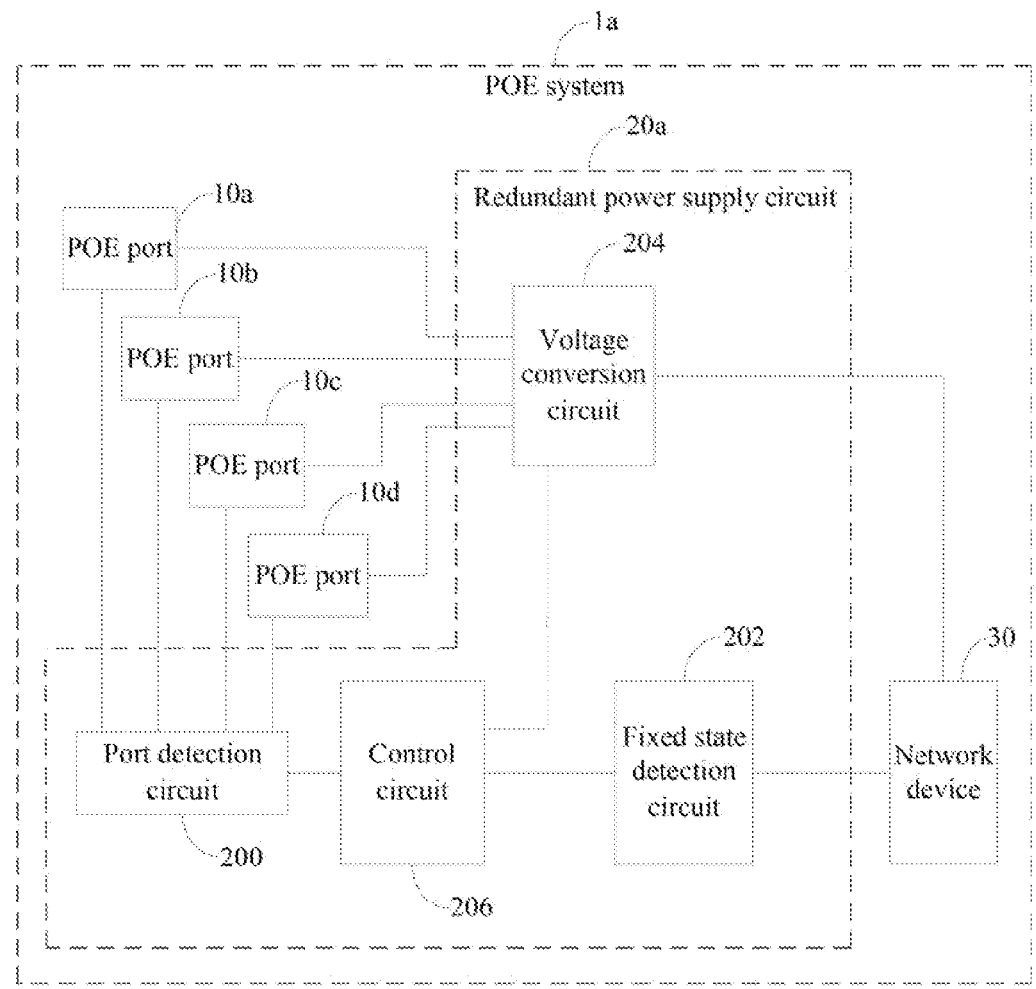
FIG. 2 is a schematic diagram of a second embodiment of a POE system.

FIG. 2 is a schematic diagram of a second embodiment of a POE system 1a. The POE system 1a comprises the plurality of POE ports 10a, 10b, 10c, 10d, a redundant power supply circuit 20a, and the network device 30. The redundant power supply circuit 20a comprises a port detection circuit 200, a fixed state detection circuit 202, a voltage conversion circuit 204, and a control circuit 206. The port detection circuit 200 is connected to the POE ports 10a, 10b, 10c, 10d. The port detection circuit 200 detects and outputs a plurality of ready signals according to the plurality of power signals of the POE ports 10a, 10b, 10c, 10d, and each of the ready signals correspond to each of the power signals output by each of the POE ports 10a, 10b, 10c, 10d. The fixed state detection circuit 202 is connected to the network device 30, and outputs first control signals according to a predetermined voltage signal of the network device 30. The voltage conversion circuit 204 is connected between the POE ports 10a, 10b, 10c, 10d and the network device 30, and converts the plurality of power signals of the POE ports 10a, 10b, 10c, 10d to driving voltage signals to drive the network device 30. The control circuit 206 receives the first control signals from the fixed state detection circuit 202 and the plurality of ready signals from the port detection circuit 200, and generates and sends enable signals to the voltage conversion circuit 204 according to the first control signals and the plurality of ready signals.

In one embodiment, the voltage conversion circuit 204 further determines if the voltage conversion circuit 204 receives the enable signals to convert the plurality of power signals. When the voltage conversion circuit 204 receives the enable signals, the voltage conversion circuit 204 converts the plurality of power signals output by the POE ports 10a, 10b, 10c, 10d to the driving voltage signals to drive the network device 30. When the voltage conversion circuit 204 does not receive the enable signals, the voltage conversion circuit 204 suspends converting, and a value of the driving voltage signals is 0 V.

In one embodiment, when the POE port 10a outputs the power signals, the port detection circuit 200 outputs the ready signals corresponding to the power signals output by the POE port 10a. When the POE port 10a does not output the power signals, the port detection circuit 200 has no corresponding ready signals to output.

Figure 3:
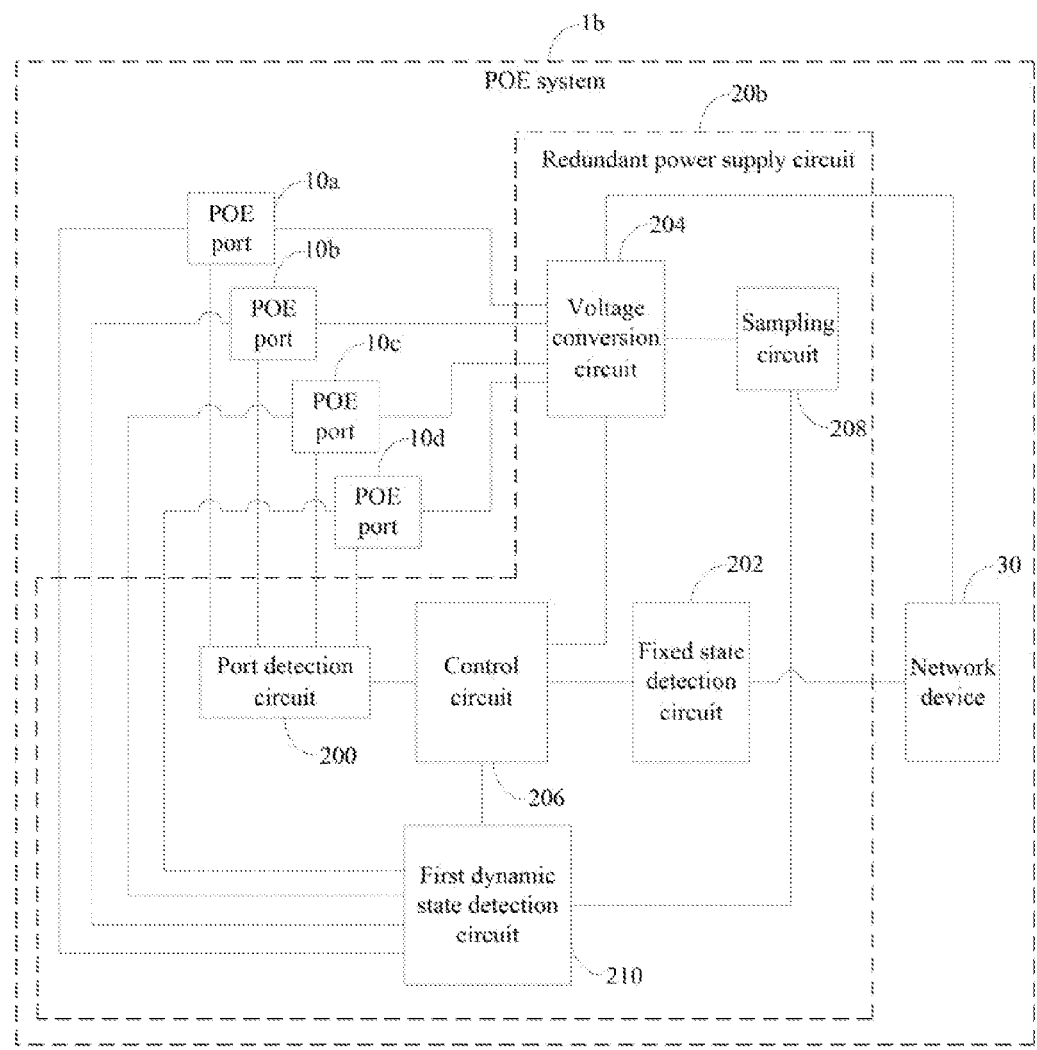
FIG. 3 is a schematic diagram of a third embodiment of a POE system.

FIG. 3 is a schematic diagram of a third embodiment of a POE system 1b. In the embodiment, the POE system 1b comprises the plurality of POE ports 10a, 10b, 10c, 10d, a redundant power supply circuit 20b, and the network device 30. The redundant power supply circuit 20b is similar to the redundant power supply circuit 20a of the second embodiment. The difference between the redundant power supply circuit 20a and the redundant power supply circuit 20b is that the redundant power supply circuit 20b further comprises a sampling circuit 208 and a first dynamic state detection circuit 210.

The sampling circuit 208 is connected to the voltage conversion circuit 204, and samples current signals flowing through the voltage conversion circuit 204 to output first sampling voltage signals. The first dynamic state detection circuit 210 is connected to the sampling circuit 208, the control circuit 206, and the POE ports 10a, 10b, 10c, 10d, and outputs second control signals according to the first sampling voltage signals output by the sampling circuit 208. The control circuit 206 further generates the enable signals according to the second control signals and the plurality of ready signals. The voltage conversion circuit 204 determines whether the plurality of power signals are converted into the driving voltage signals according to whether the voltage conversion circuit 204 receives the enable signal from the control circuit 206, and the POE ports 10a, 10b, 10c, 10d further determines if the POE ports 10a, 10b, 10c, 10d suspend work according to the second control signals. When the POE ports 10a, 10b, 10c, 10d receive the second control signals, the POE ports 10a, 10b, 10c, 10d suspend work. When the POE ports 10a, 10b, 10c, 10d do not receive the second control signals, the POE ports 10a, 10b, 10c, 10d are in a working state for outputting the power signals.

In one embodiment, the power signals of the network device 30 is supplied by the voltage conversion circuit 204 so that the sampling circuit 208 can be connected to the voltage conversion circuit 204 to sample the current signals, or can be connected to the network device 30 to sample the current signals.

In one embodiment, when the network device 30 is in a full load state, the network device 30 has a maximum power need. The current signals sampled by the sampling circuit 208 are in the full load state flowing through the network device 30, and the POE ports 10a, 10b, 10c, 10d determine the number of the POE ports 10a, 10b, 10c, 10d needed to drive the network device 30 according to the maximum power of the network device 30. Thereby, the power of the power signals supplied by the redundant power supply circuit 20b is substantially matched with the power needed by the network device 30 in the working state.

Figure 4:
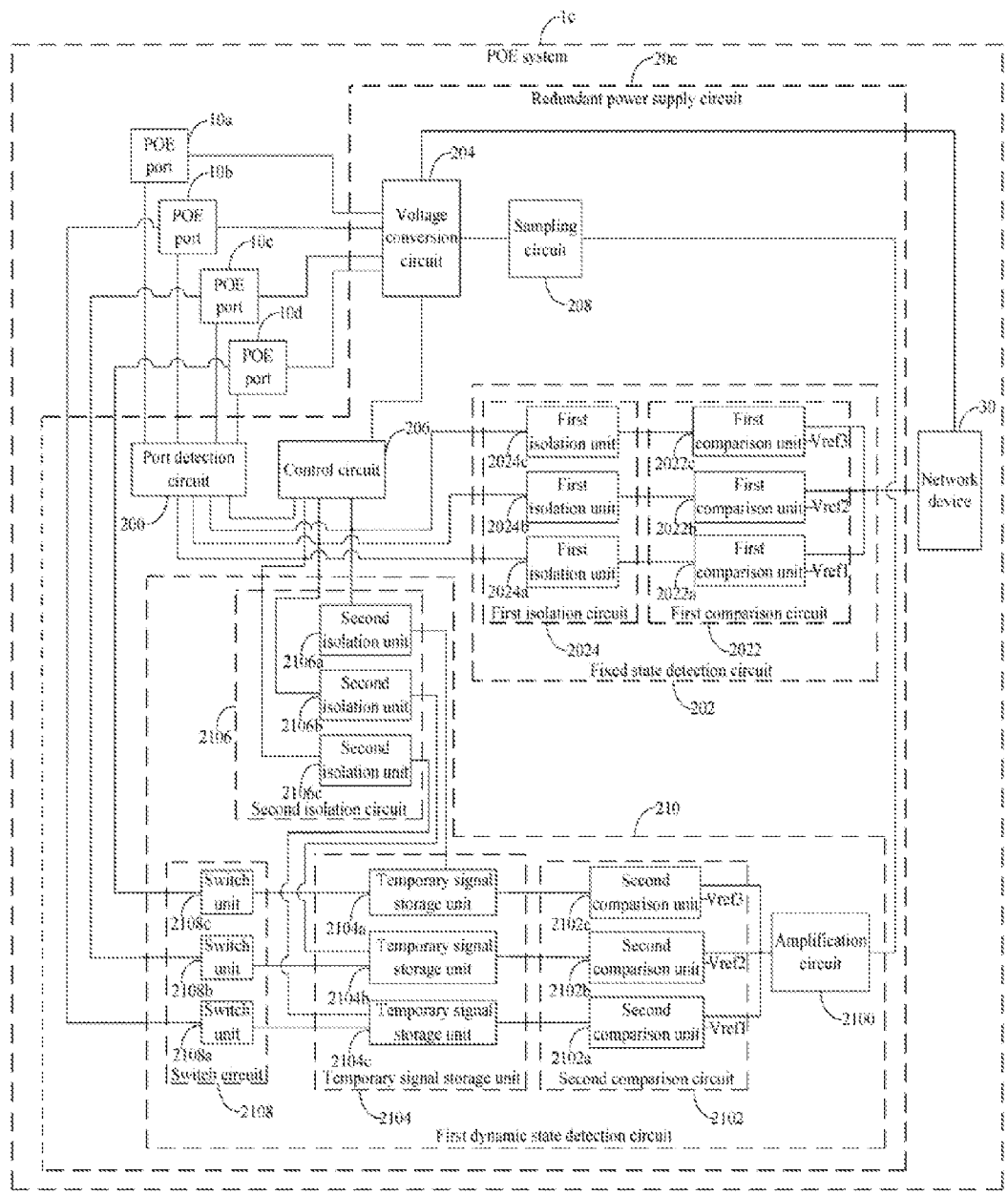
FIG. 4 is a schematic diagram of a fourth embodiment of a POE system.

FIG. 4 is a schematic diagram of a fourth embodiment of a POE system 1c. In the embodiment, the fixed state detection circuit 202 comprises a first comparison circuit 2022 and a first isolation circuit 2024. The first comparison circuit 2022 compares the predetermined voltage signal of the network device 30 with a plurality of reference voltage signals (such as a reference voltage signal Vref1, a reference voltage signal Vref2, and a reference voltage signal Vref3) to output the first control signals. The first comparison circuit 2022 comprises a plurality of first comparison units 2022a, 2022b, 2022c. Each of the first comparison units 2022a, 2022b, 2022c compares the predetermined voltage signal with each of the reference voltage signals Vref1, Vref2, Vref3. That is, the first control signals output by the fixed state detection circuit 202 comprises a plurality of comparison signals output by the first comparison units 2022a, 2022b, 2022c. A first terminal of the first isolation circuit 2024 is connected to the first comparison circuit 2022, and a second terminal of the first isolation circuit 2024 is connected to a node between the port detection circuit 200 and the control circuit 206. The first isolation circuit 2024 isolates the first comparison circuit 202 from the port detection circuit 200 so that the port detection circuit 200 can transmit the plurality of ready signals to the control circuit 206. The first isolation circuit 2024 comprises a plurality of first isolation units 2024a, 2024b, 2024c. Each of the first isolation units 2024a, 2024b, 2024c isolates each of the first comparison units 2022a, 2022b, 2022c from the port detection circuit 200.

In one embodiment, the predetermined voltage signal is determined by a theoretical power of the network device 30. The theoretical power is a maximum value that all modules of the network device 30 are in the working state.

In one embodiment, the plurality of POE ports are four POE ports 10a, 10b, 10c, 10d. Three first comparison units 2022a, 2022b, 2022c can output four types first control signals corresponding to four power levels so that the number of the plurality of first comparison units is three, the number of the plurality of reference voltage signals is three, and the number of the plurality of first isolation units is three. Each of the first isolation units 2024a, 2024b, 2024c is connected to each of the comparison units 2022a, 2022b, 2022c, respectively. The number of the plurality of first comparison units is equivalent to the number of the plurality of first isolation units. In other embodiments, when the number of the plurality of POE ports is N(N=1, 2, 3, 4 . . . ), the number of the plurality of first comparison units and the number of the plurality of first isolation units both are N-1. That is, the number of the plurality of first comparison units is one less than the number of the plurality of POE ports.

The first dynamic state detection circuit 210 comprises an amplification circuit 2100, a second comparison circuit 2102, a temporary signal storage circuit 2104, a second isolation circuit 2106, and a switch circuit 2108. The amplification circuit 2100 amplifies the first sampling voltage signals output by the sampling circuit 208 into second sampling voltage signals. The second comparison circuit 2102 comprises a plurality of comparison units 2102a, 2102b, 2102c, and compares the second sampling voltage signals with the plurality of reference voltage signals to output the second control signals. The temporary signal storage circuit 2104 comprises a plurality of temporary signal storage units 2104a, 2104b, 2104c, and receives and stores the second control signals. A first terminal of the second isolation circuit 2106 is connected to the temporary signal storage circuit 2104, and a second terminal of the second isolation circuit 2106 is connected to a node between the port detection circuit 200 and the control circuit 206. The second isolation circuit 2106 comprises a plurality of second isolation units 2106a, 2106b, 2106c, and isolates the temporary signal storage circuit 2104 from the port detection circuit 200 so that the port detection circuit 200 can transmit the plurality of ready signals to the control circuit 206. The switch circuit 2108 comprises a plurality of switch units 2108a, 2108b, 2108c. The switch circuit 2108 is connected to the temporary signal storage circuit 2104, and outputs a plurality of suspending signals according to the second control signals output by the temporary signal storage circuit 2104. The POE ports 10a, 10b, 10c, 10d further determine if the POE ports 10a, 10b, 10c, 10d suspend work according to the plurality of suspending signals output by the switch units 2108a, 2108b, 2108c.

In one embodiment, the plurality of POE ports are four POE ports 10a, 10b, 10c, 10d, and the first sampling voltage signals are signals that are output by the sampling circuit 208 when the network device 30 is in the full load state. The first dynamic state detection circuit 210 determines the number of the POE ports 10a, 10b, 10c, 10d needed by the network device 30 according to the second control signals. To ensure the network device 30 is in the working state, one or more POE ports 10a, 10b, 10c, 10d should output the power signals. Therefore, the first dynamic state detection circuit 210 can turn off three POE ports 10b, 10c, 10d at most so that the number of the plurality of second comparison units is three, the number of the plurality of reference voltage signals is three, the number of the plurality of temporary signal storage units is three, the number of the plurality of second isolation units is three, and the number of the plurality of switch units is three. In other embodiments, when the number of the plurality of POE ports is N (N=1, 2, 3, 4 . . . ), the number of the plurality of second comparison units, the number of the plurality of temporary signal storage unit, the number of the plurality of second isolation units, and the number of the plurality of switch units are all N−1.

Figure 5:
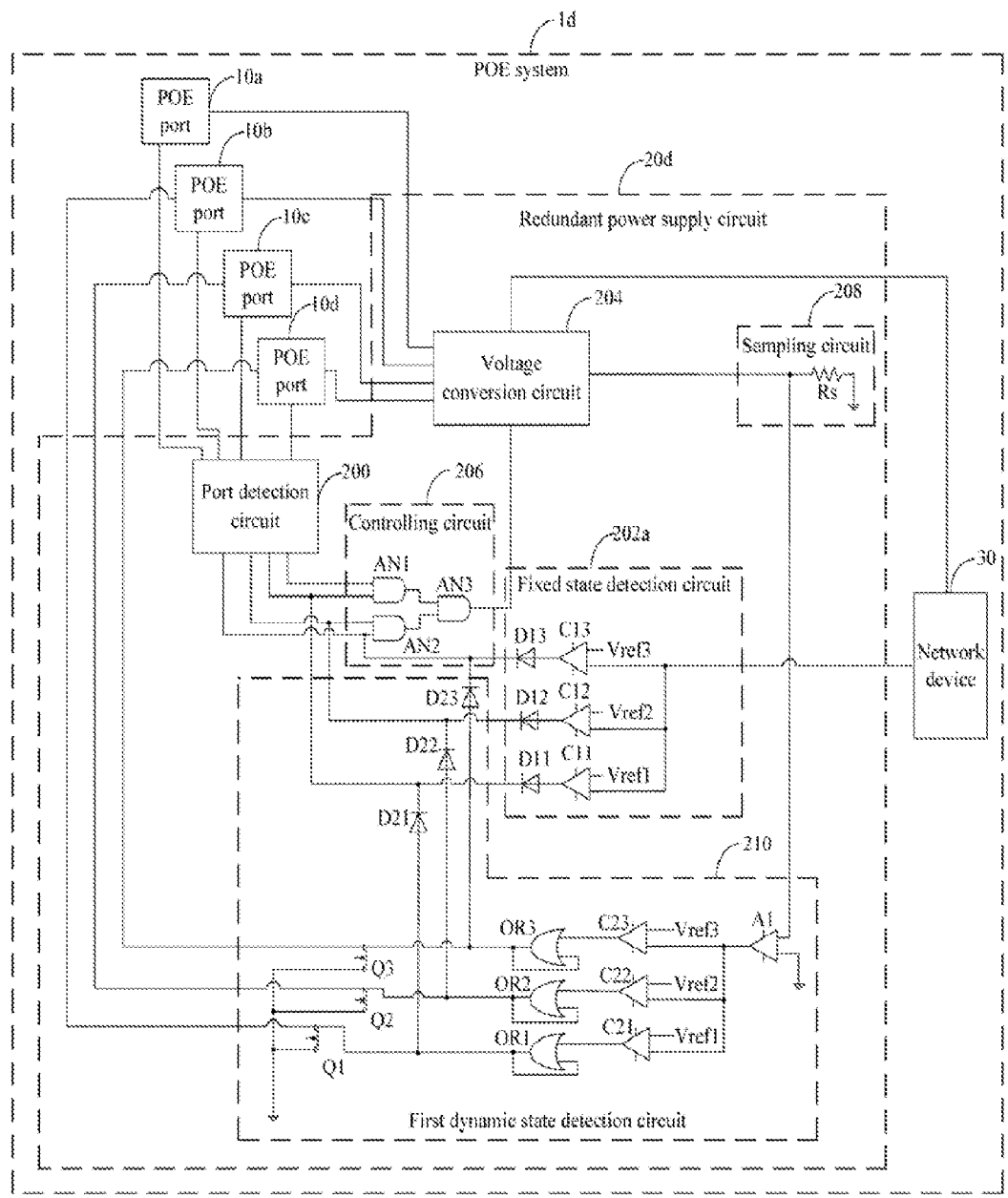
FIG. 5 is a schematic diagram of a fifth embodiment of a POE system.

FIG. 5 is a circuit diagram of a fifth embodiment of a POE system 1d. In the embodiment, the plurality of POE ports comprise four POE ports 10a, 10b, 10c, 10d. The port detection circuit 200 comprises a first detection terminal, a second detection terminal, a third detection terminal, a fourth detection terminal, a first signal output terminal, a second signal output terminal, a third signal output terminal, and a fourth signal output terminal. The port detection circuit 200 determines if the POE ports 10a, 10b, 10c, 10d output power signals via the first detection terminal, the second detection terminal, the third detection terminal, and the fourth detection terminal, and respectively outputs the plurality of ready signals via the first signal output terminal, the second signal output terminal, the third signal output terminal, and the fourth signal output terminal after detecting the POE ports 10a, 10b, 10c, 10d are outputting the power signals. In one embodiment, when the port detection circuit 200 detects that the POE port 10a outputs the power signals, the first signal output terminal of the port detection circuit 200 outputs the ready signals corresponding to the POE port 10a. When the port detection circuit 200 detects that the POE port 10b outputs the power signals, the second signal output terminal of the port detection circuit 200 outputs the ready signals corresponding to the POE port 10b. When the port detection circuit 200 detects that the POE port 10c outputs the power signals, the third signal output terminal of the port detection circuit 200 outputs the ready signals corresponding to the POE port 10c. When the port detection circuit 200 detects that the POE port 10d outputs the power signals, the fourth signal output terminal of the port detection circuit 200 outputs the ready signals corresponding to the POE port 10d.

In one embodiment, the port detection circuit 200 can be a known port detection module that detects the power signals of the POE ports 10a, 10b, 10c, 10d, i.e., port detection modules that already exist in current technology.

The first comparison unit 2022a comprises a first comparator C11, the first comparison unit 2022b comprises a first comparator C12, and the first comparison unit 2022c comprises a first comparator C13. The first isolation unit 2024a comprises a first diode D11, the first isolation unit 2024b comprises a first diode D12, and the first isolation unit 2024c comprises a first diode D13. The first comparator C11 comprises a positive input terminal, a negative input terminal, and an output terminal. The positive input terminal of the first comparator C11 receives the reference voltage signal Vref1, the negative input terminal of the first comparator C11 is connected to the network device 30, to receive the predetermined voltage signal from the network device 30, the output terminal of the first comparator C11 is connected to an anode of the first diode D11, and a cathode of the first diode D11 is connected to a first node between the port detection circuit 200 and the control circuit 206. The first comparator C12 comprises a positive input terminal, a negative input terminal, and an output terminal. The positive input terminal of the first comparator C12 receives the reference voltage signal Vref2, the negative input terminal of the first comparator C12 is connected to the network device 30, to receive the predetermined voltage signal from the network device 30, the output terminal of the first comparator C12 is connected to an anode of the first diode D12, and a cathode of the first diode D12 is connected to a second node between the port detection circuit 200 and the control circuit 206. The first comparator C13 comprises a positive input terminal, a negative input terminal, and an output terminal. The positive input terminal of the first comparator C13 receives the reference voltage signal Vref3, the negative input terminal of the first comparator C13 is connected to the network device 30, to receive the predetermined voltage signal from the network device 30, the output terminal of the first comparator C13 is connected to an anode of the first diode D13, and a cathode of the first diode D13 is connected to a third node between the port detection circuit 200 and the control circuit 206. The first comparison units 2022a, 2022b, 2022c can be other voltage comparison modules, and the first isolation units 2024a, 2024b, 2024c can also be other signal isolation modules in other embodiments.

In one embodiment, a value of the reference voltage signal Vref3 is greater than a value of the reference voltage signal Vref2, and the value of the reference voltage signal Vref2 is greater than a value of the reference voltage signal Vref1. The first comparator C11, C12, C13 respectively compares the reference voltage signals Vref1, Vref2, Vref3 with the predetermined voltage signal of the network device 30 to output the plurality of comparison signals, to make a fixed state detection circuit 202a output the first control signals according to the predetermined voltage signal of the network device 30.

In one embodiment, in response to the POE ports 10a, 10b, 10c, 10d operating according to the IEEE802.3 standard, each of the POE ports 10a, 10b, 10c, 10d can supply 25 W (watt) power at most. Therefore, four POE ports 10a, 10b, 10c, 10d can supply 100 W power at most, and the value of the theoretical power of the network device 30 should be less than 100 W. The plurality of power signals output by the POE ports 10a, 10b, 10c, 10d can be partitioned into four power levels, such as a first power level 0-25 W, a second power level 25-50 W, a third power level 50-75 W, and a fourth power level 75-100 W.

In one embodiment, the larger the value of the theoretical power, the larger the value of the predetermined voltage signal. When a value of the theoretical power is 0-25 W, a value of the predetermined voltage signal is 0-1.25V. When the value of the theoretical power is 25-50 W, the value of the predetermined voltage signal is 1.25-2.5V. When the value of the theoretical power is 50-75 W, the value of the predetermined voltage signal is 2.5-3.75V. When the value of the theoretical power is 75-100 W, the value of the predetermined voltage signal is 3.75-5V. Three reference voltage signal Vref1, Vref2, Vref3 can determine four power levels so that the reference voltage signal Vref1 is 1.25V, the reference voltage signal Vref2 is 2.5V, and the reference voltage signal Vref3 is 3.75V. Each of the reference voltage signals is corresponding to each of the power levels of the plurality of power signals. In other embodiments, when the value of the theoretical power of the network device 30 is greater than 100 W, the fixed state detection circuit 202a can add a first comparator, a first diode, and a reference voltage signal in at per 25 W to meet the actual circuit design.

The voltage conversion circuit 204 can be a known power modules that convert the plurality of power signals, i.e., power modules that already exist in current technology.

The control circuit 206 comprises a plurality of AND gates AN1, AN2, AN3. In one embodiment, each of the AND gates AN1, AN2, AN3 comprises two input terminals, and the number of the POE ports 10a, 10b, 10c, 10d is four so that the number of the AND gates AN1, AN2, AN3 is three. The AND gate AN1 comprises a first input terminal, a second input terminal, and a output terminal. The first input terminal of the AND gate AN1 is connected to the first signal output terminal of the port detection circuit 200, and the second input terminal of the AND gate AN1 is connected to the cathode of the first diode D11 and the second output terminal of the port detection circuit 200. The AND gate AN2 comprises a first input terminal, a second input terminal, and an output terminal. The first input terminal of the AND gate AN2 is connected to the cathode of the first diode D12 and the third output terminal of the port detection circuit 200, and the second input terminal of the AND gate AN2 is connected to the cathode of the first diode D13 and the fourth output terminal of the port detection circuit 200. The AND gate AN3 comprises a first input terminal, a second input terminal, and a output terminal. The first input terminal of the AND gate AN3 is connected to the output terminal of the AND gate AN1, the second input terminal of the AND gate AN3 is connected to the output terminal of the AND gate AN2, and the output terminal of the AND gate AN3 is connected to the voltage conversion circuit 204.

In one embodiment, when the two input terminals of the AND gates AN1, AN2 are both in a high level (logic 1), the output terminal of the AND gate AN3 is at the high level, and the control circuit 206 outputs the enable signals. That is, the AND gates AN1, AN2, AN3 output the enable signals when a value of power supplied by the POE ports 10a, 10b, 10c, 10d is greater than the value of the theoretical power of the network device 30. In other embodiments, the control circuit 206 can be other modules or chips that output the enable signals, i.e., Micro Controller Unit (MCU), Single Chip Micyoco (SCM) that already exist in current technology.

In one embodiment, when the value of the theoretical power of the network device 30 is 60 W, the POE system 1d needs three POE ports 10a, 10b, 10c because each of the POE ports 10a, 10b, 10c can supply 25 W power at most, and the value of the predetermined voltage signal of the network device 30 is less than 3.75V and greater than 2.5V. The reference voltage signal Vref1 is 1.25V, the reference voltage signal Vref2 is 2.5V, and the reference voltage signal Vref3 is 3.75V so that the first comparator C11, C12 both output a low level signal, and the first comparator C13 outputs a high level signal. When the first detection terminal, the second detection terminal, and the third detection terminal of the port detection circuit 200 respectively detects that the POE ports 10a, 10b, 10c output the power signals, the first signal output terminal, the second signal output terminal, and the third signal output terminal of the port detection circuit 200 output the high level. Whether the POE ports 10d output the power signals or not, the two input terminals of the AND gate AN1, AN2 are both at the high level because of isolation functions of the first diode D11, D12, D13. The output terminal of the AND gate AN3 is at the high level so that the control circuit 206 outputs the enable signals and sends the enable signals to the voltage conversion circuit 204, and the voltage conversion circuit 204 converts the power signals to drive the network device 30. When the port detection circuit only detects that two POE ports 10a, 10b output the power signals, the third signal output terminal of the port detection circuit 200 is at the low level (logic 0), the output terminal of the first comparator C12 is at the low level so that the first input terminal of the AND gate AN2 is at the low level, the output terminal of the AND gate AN3 is at the low level, the control circuit 206 has no enable signals to output, the voltage conversion circuit 204 suspends converting, and the value of the driving voltage signals is 0V. When the voltage conversion circuit 204 is in the working state, the control circuit 206 ensures that the value of the power supplied by the POE ports 10a, 10b, 10c, 10d is greater than the value of the theoretical power of the network device 30, to avoid the power supplied by the POE ports 10a, 10b, 10c, 10d failing to meet a requirement of the network device 30 and damaging the network device 30.

When the port detection circuit 200 detects that no less than three POE ports 10a, 10b, 10c output the power signals, the control circuit 206 outputs the enable signals, and the voltage conversion circuit 204 converts the power signals to drive the network device 30. In other embodiments, the theoretical power of the network device 30 is 80 W. When the port detection circuit 200 detects that no less than four POE ports 10a, 10b, 10c, 10d outputs the power signals, the control circuit 206 outputs the enable signals, and the voltage conversion circuit 204 converts the power signals to drive the network device 30.

The sampling circuit 208 comprises a resistor Rs, a first end of the resistor Rs is connected to the voltage conversion circuit 204, and a second end of the resistor Rs is grounded. The resistor Rs samples and converts the current signals flowing through the voltage conversion circuit 204 into the first sampling voltage signals.

In one embodiment, a resistance of the resistor Rs is determined by actual circuit designs. The sampling circuit 208 can include a current transformer instead of the resistor Rs to sample the current signals, and the sampling circuit 208 can be other sampling modules in other embodiments.

The amplification circuit 2100 comprises an amplifier A1. The second comparison unit 2102a comprises a second comparator C21, the second comparison unit 2102b comprises a second comparator C22, and the second comparison unit 2102c comprises a second comparator C23. The temporary signal storage unit 2104a comprises an OR gate OR1, the temporary signal storage unit 2104b comprises an OR gate OR2, and the temporary signal storage unit 2104c comprises an OR gate OR3. The second isolation unit 2106a comprises a second diode D21, the second isolation unit 2106b comprises a second diode D22, and the second isolation unit 2106c comprises a second diode D23. The switch unit 2108a comprises a switch Q1, the switch unit 2108b comprises a switch Q2, and the switch unit 2108c comprises a switch Q3. The amplifier A1 comprises a positive input terminal, a negative input terminal, and an output terminal. The positive input terminal of the amplifier A1 is connected to a node between the resistor Rs and the voltage conversion circuit 204, the negative input terminal of the amplifier A1 is grounded, and the amplifier A1 amplifies the first sampling voltage signals into the second sampling voltage signals. The second comparator C21 comprises a positive input terminal, a negative input terminal, and an output terminal. The positive input terminal of the second comparator C21 receives the reference voltage signal Vref1, and the negative input terminal of the second comparator C21 is connected to the output terminal of the amplifier A1. The second comparator C22 comprises a positive input terminal, a negative input terminal, and an output terminal. The positive input terminal of the second comparator C22 receives the reference voltage signal Vref2, and the negative input terminal of the second comparator C22 is connected to the output terminal of the amplifier A1. The second comparator C23 comprises a positive input terminal, a negative input terminal, and an output terminal. The positive input terminal of the second comparator C23 receives the reference voltage signal Vref3, and the negative input terminal of the second comparator C23 is connected to the output terminal of the amplifier A1. The OR gate OR1 comprises a first input terminal, a second input terminal, and an output terminal. The first input terminal of the OR gate OR1 is connected to the output terminal of the second comparator C21, the output terminal of the OR gate OR1 is connected to an anode of the second diode D21, the second input terminal of the OR gate OR1 is connected to a node between the second diode D21 and the output terminal of the OR gate OR1, and an cathode of the second diode D21 is connected to a node between the first diode D11 and the port detection circuit 200. The OR gate OR2 comprises a first input terminal, a second input terminal, and an output terminal. The first input terminal of the OR gate OR2 is connected to the output terminal of the second comparator C22, the output terminal of the OR gate OR2 is connected to an anode of the second diode D22, the second input terminal of the OR gate OR2 is connected to a node between the second diode D22 and the output terminal of the OR gate OR2, and an cathode of the second diode D22 is connected to a node between the first diode D12 and the port detection circuit 200. The OR gate OR3 comprises a first input terminal, a second input terminal, and an output terminal. The first input terminal of the OR gate OR3 is connected to the output terminal of the second comparator C23, the output terminal of the OR gate OR3 is connected to an anode of the second diode D23, the second input terminal of the OR gate OR3 is connected to a node between the second diode D23 and the output terminal of the OR gate OR3, and an cathode of the second diode D23 is connected to a node between the first diode D13 and the port detection circuit 200. The switch Q1 comprises a first terminal, a second terminal, and a control terminal. The first terminal of the switch Q1 is connected to the POE port 10b, the second terminal of the switch Q1 is grounded, and the control terminal of the switch Q1 is connected to a node between the OR gate OR1 and the second diode D21. The switch Q2 comprises a first terminal, a second terminal, and a control terminal. The first terminal of the switch Q2 is connected to the POE port 10c, the second terminal of the switch Q2 is grounded, and the control terminal of the switch Q2 is connected to a node between the OR gate OR2 and the second diode D22. The switch Q3 comprises a first terminal, a second terminal, and a control terminal. The first terminal of the switch Q3 is connected to the POE port 10d, the second terminal of the switch Q3 is grounded, and the control terminal of the switch Q3 is connected to a node between the OR gate OR3 and the second diode D23.

In one embodiment, the second control signals comprise a plurality of comparison signals output by the second comparators C21, C22, C23.

When the first dynamic state detection circuit 210 is in the working state, the redundant power supply circuit 20d controls the network device 30 in the full load state for a brief time to make the current signals flowing through the voltage conversion circuit 204 have a maximum value. The first dynamic state detection circuit 210 outputs the second control signals according to the first sampling voltage signals output by the sampling circuit 208 in the full load state, and controls the POE ports 10a, 10b, 10c, 10d turned off according to the maximum power needed by the network device 30. The first dynamic state detection circuit 210 precisely determines the number of POE ports 10a, 10b, 10c, 10d needed by the network device 30 in a working state, to avoid a maximum difference between the value of the theoretical power and the value of the maximum power of the network device 30 that cause unnecessary power signals supplied by the POE ports.

In one embodiment, the value of the theoretical power of the network device 30 is 60 W, the value of the maximum power of the network device 30 is 40 W, and each of the POE ports supply 25 W power. In an initial state, the port detection circuit 202a must detect three POE ports 10a, 10b, 10c outputting power signals, to control the control circuit 206 to output the enable signals, and the voltage conversion circuit 204 converts the power signals according to the enable signals to drive the network device 30. The first terminal of the switches Q1, Q2, Q3 are high level. In a stable state, the network device 30 only needs two POE ports 10a, 10b to drive so that the first dynamic state detection circuit 210 should turn off the POE port 10c. In the initial state, the fixed state detection circuit 202a outputs the first control signals, and the first terminal of the switches Q1, Q2, Q3 are high level. In the stable state, the fixed state detection circuit 202a suspends outputting the first control signals, the first dynamic state detection circuit 210 detects that the value of the maximum power of the network device 30 is 40 W so that the value of the second sampling voltage signals output by the amplifier A1 is greater than 1.25V and less than 2.5V. The output terminal of the second comparator C21 is at the low level, the output terminal of the OR gate OR1 is at the low level, the output terminal of the second comparators C22, C23 are at the high level, and the output terminal of the OR gates OR2, OR3 are at the high level. The output terminal of the OR gates OR1, OR2, OR3 keep the electrical level state until the redundant power supply circuit 20d resets.

When the port detection circuit 200 detects the POE ports 10a, 10b output the power signals, the output terminal of the AND gate AN1 is at a high level. Whether the POE ports 10c, 10d output the power signals or not, the output terminal of the AND gate AN2 is at a high level, and the control circuit 206 outputs and sends the enable signals to the voltage conversion circuit 204 driving the network device 30. When the POE ports 10a, 10b both output the power signals, the control circuit 206 continues outputting and sending the enable signals to the voltage conversion circuit 204 because the OR gates OR1, OR2, OR3 stay in the electrical level state.

In the stable state, the switch Q1 is turned off, the first terminal of the switch Q1 is high level, the switches Q2, Q3 are turned on, and the first terminal of the switches Q2, Q3 both change to low level. The switch circuit 2108 outputs and sends the suspending signals to the POE ports 10c, 10d according to the electrical level changes of the switches Q2, Q3. The POE ports 10c, 10d are turned off or remain turned off after receiving the suspending signals, and the POE ports 10c, 10d have no power signals to output.

In one embodiment, an amplification factor of the amplifier A1 is determined by actual circuit designs. The switches Q1, Q2, Q3 can be an N type metal-oxide semiconductor field effect transistor (NMOSFET), a P type metal-oxide semiconductor field effect transistor (PMOSFET), a npn type transistor, and a pnp type transistor. In other embodiments, the amplification circuit 2100 can be a transistor to amplify the first sampling voltage signals, or other amplification modules. The temporary signal storage units 2104a, 2104b, 2104c can be a flip-flop, or other storage modules. The second comparison units 2102a, 2102b, 2102c can be other voltage comparison modules, and the second isolation units 2104a, 2104b, 2104c can be other signal isolation modules.

In one embodiment, a needed power of network device 30 is greater than 0 W in the working state so that three POE ports 10b, 10c, 10d are turned off at most according to the second control signals output by the first dynamic state detection circuit 210, the number of the second comparators C21, C22, C23 is three, the number of the OR gates OR1, OR2, OR3 is three, the number of the second diodes D21, D22, D23 is three, and the number of the switches Q1, Q2, Q3 is three. In other embodiments, when the number of POE ports is greater than four, the first dynamic state detection circuit 210 can add a second comparator, an OR gate, a second diode, a switch, and a reference voltage signal in per POE port.

Figure 6:
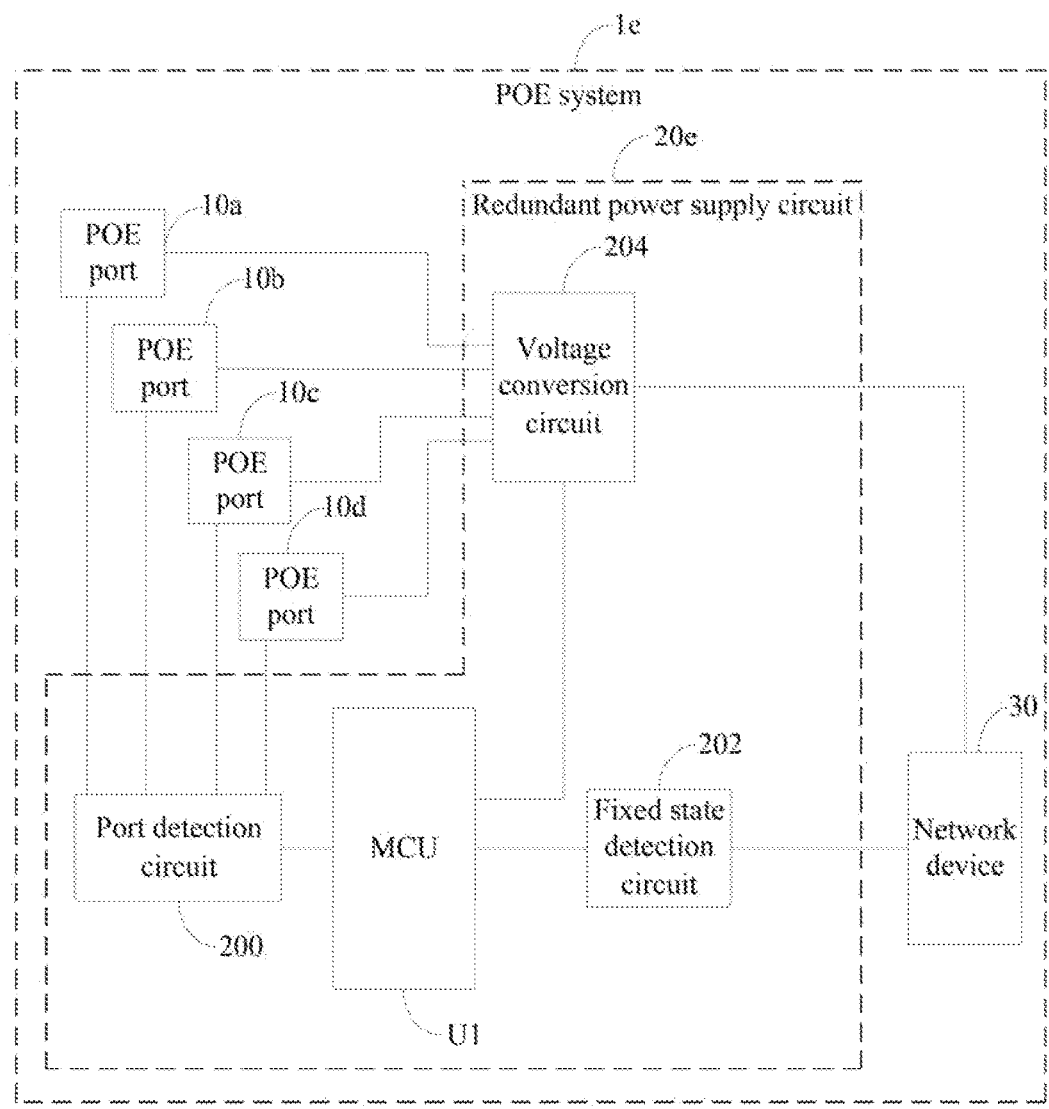
FIG. 6 is a schematic diagram of a sixth embodiment of a POE system.

FIG. 6 is a schematic diagram of a sixth embodiment of a POE system 1e. In the embodiment, the POE system 1e comprises the plurality of POE ports 10a, 10b, 10c, 10d, a redundant power supply circuit 20e, and the network device 30. The redundant power supply circuit 20e comprises the port detection circuit 200, the fixed state detection circuit 202, the voltage conversion circuit 204, and a MCU U1. The port detection circuit 200, the fixed state detection circuit 202, and the voltage conversion circuit 204 are similar to the port detection circuit 200, the fixed state detection circuit 202, and the voltage conversion circuit 204 of the second embodiment. The MCU U1 is connected to the port detection circuit 200, the fixed state detection circuit 202, and the voltage conversion circuit 204, and generates and sends the enable signals to the voltage conversion circuit 204 according to the first control signals output by the fixed state detection circuit 202 and the plurality of ready signals output by the port detection circuit 200.

Figure 7:
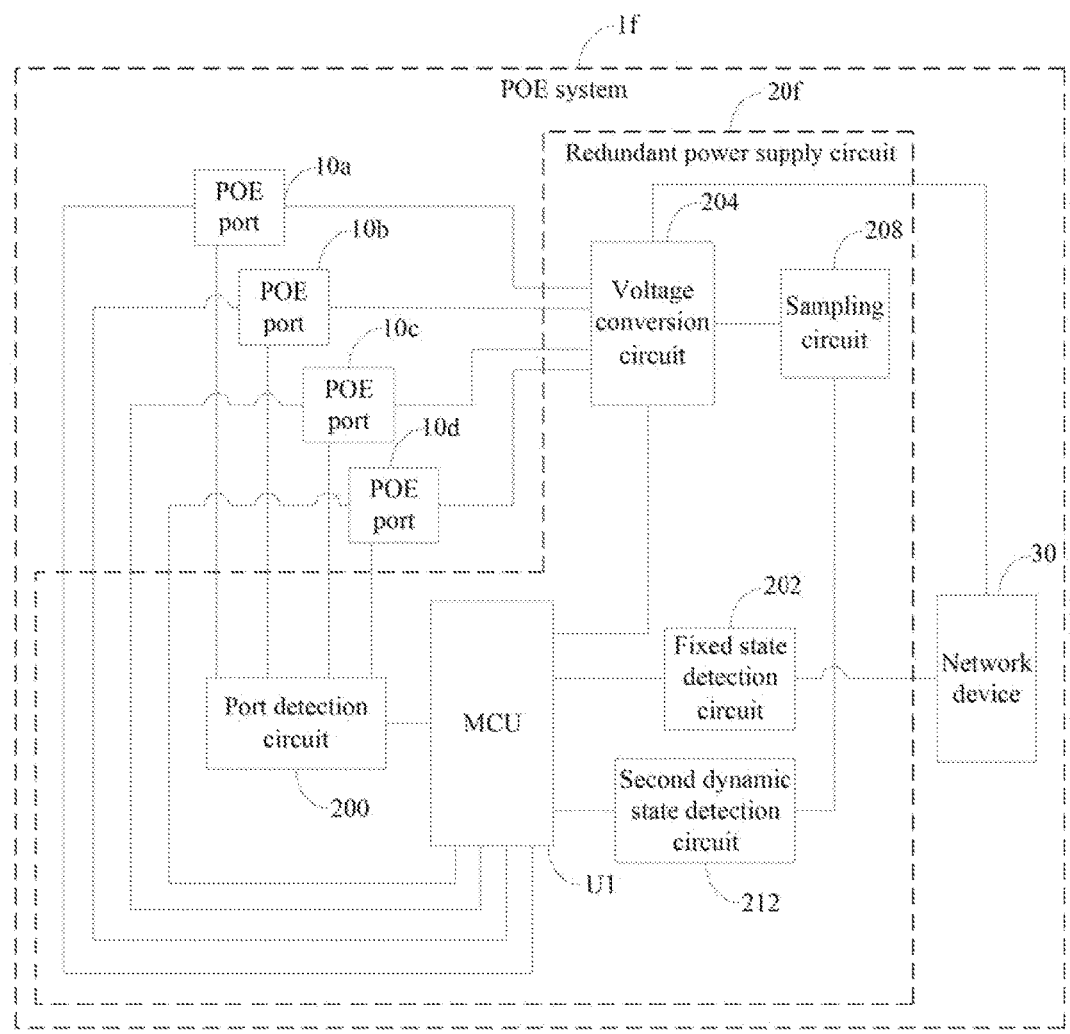
FIG. 7 is a schematic diagram of a seventh embodiment of a POE system.

FIG. 7 is a schematic diagram of a seventh embodiment of a POE system 1f. In the embodiment, the POE system if comprises the plurality of POE ports 10a, 10b, 10c, 10d, a redundant power supply circuit 20f, and the network device 30. The redundant power supply circuit 20f is similar to the redundant power supply circuit 20e of the sixth embodiment. The difference between the redundant power supply circuit 20f and the redundant power supply circuit 20e is that the redundant power supply circuit 20f further comprises the sampling circuit 208 and a second dynamic state detection circuit 212.

The second dynamic state detection circuit 212 is connected to the sampling circuit 208 and the MCU U1, and outputs the second control signals according to the first sampling voltage signals output by the sampling circuit 208. The MCU U1 further generates the enable signals according to the second control signals output by the second dynamic state detection circuit 212 and the plurality of ready signals output by the port detection circuit 200.

The MCU U1 is further connected to the POE ports 10a, 10b, 10c, 10d, and outputs third control signals according to the second control signals output by the second dynamic state detection circuit 212. The POE ports 10a, 10b, 10c, 10d further determine if the POE ports 10a, 10b, 10c, 10d suspend work according to the third control signals. When the POE ports 10a, 10b, 10c, 10d receive the third control signals, the POE ports 10a, 10b, 10c, 10d suspend outputting the power signals.

Figure 8:
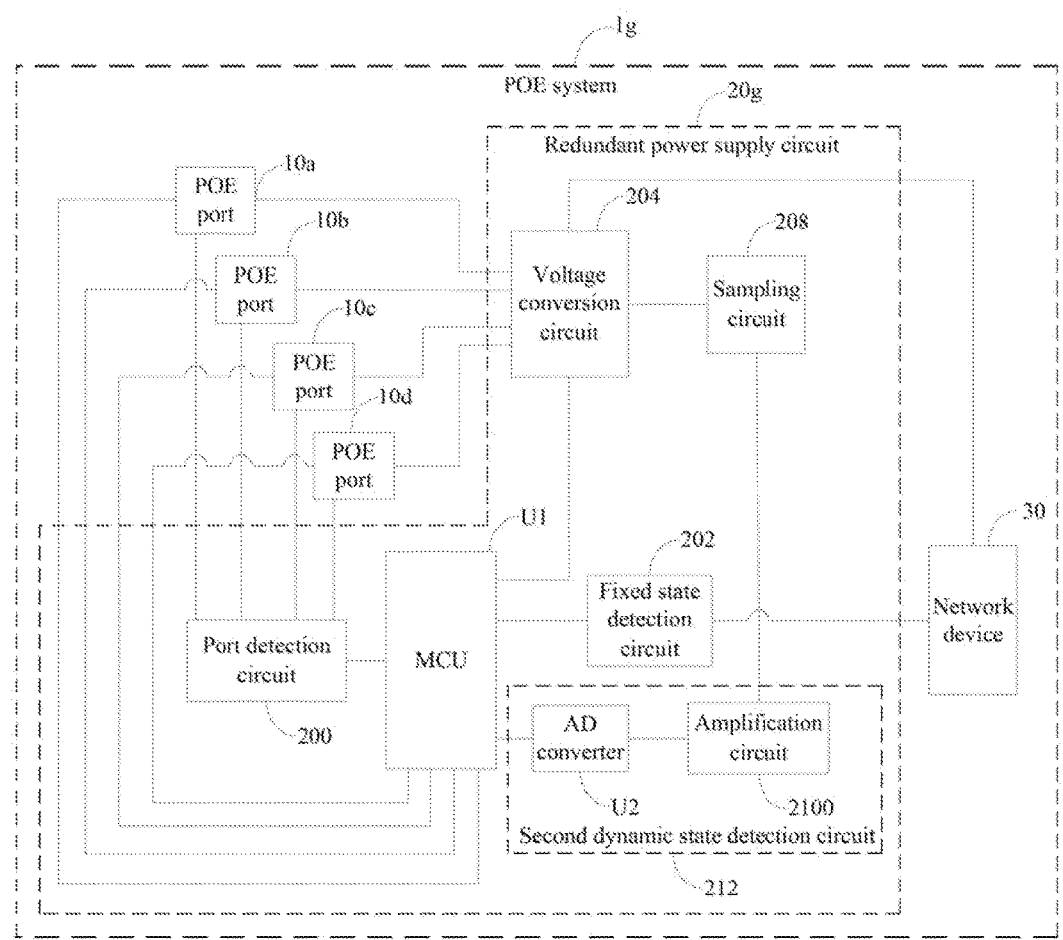
FIG. 8 is a schematic diagram of a eighth embodiment of a POE system.

FIG. 8 is a schematic diagram of an eighth embodiment of a POE system 1g. In the embodiment, the second dynamic state detection circuit 212 comprises the amplification circuit 2100 and a AD converter U2. The AD converter U2 is connected between the MCU U1 and the amplification circuit 2100, and outputs the second control signals to the MCU U1 according to the second sampling voltage signals output by the amplification circuit 2100.

Figure 9:
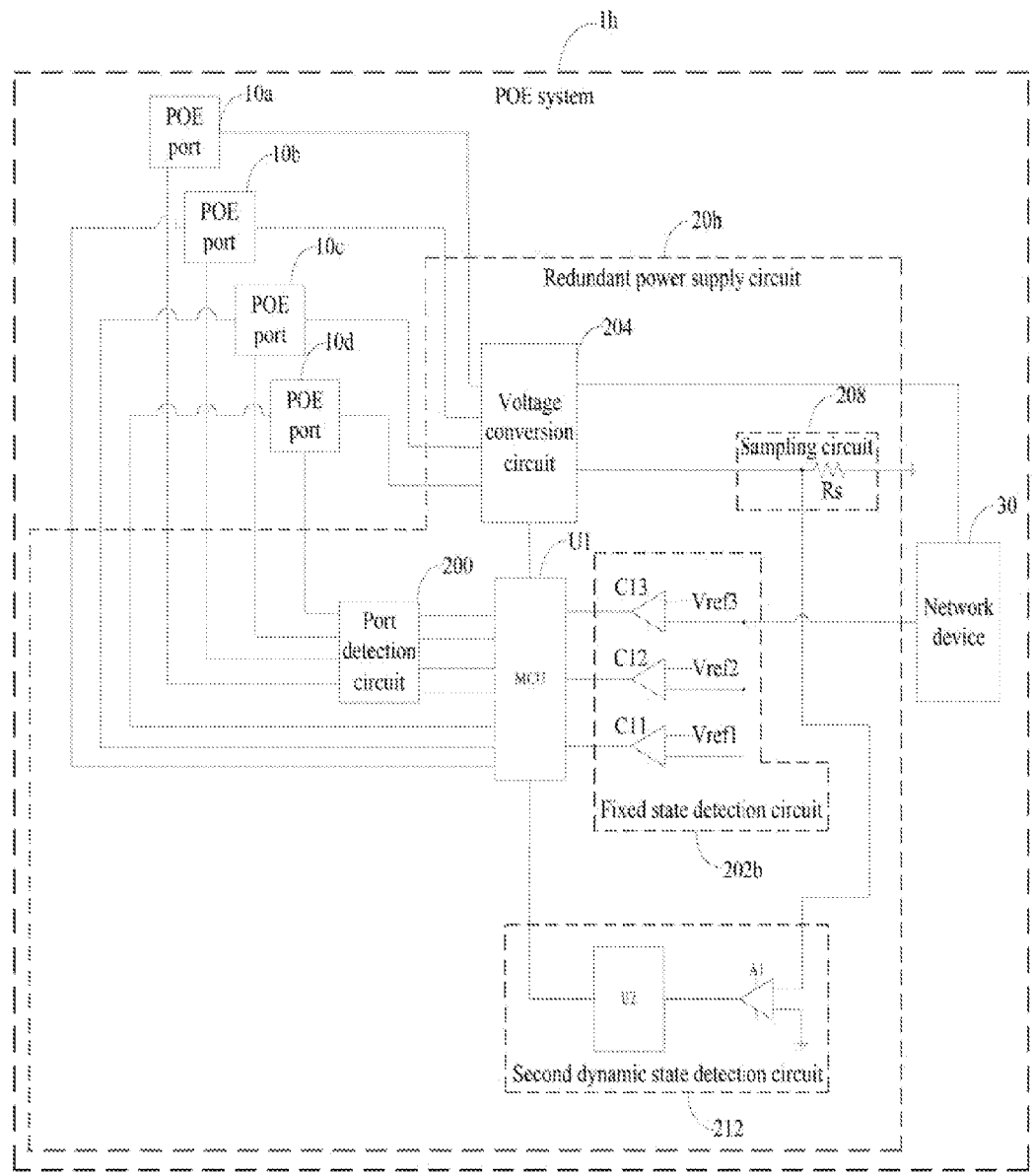
FIG. 9 is a schematic diagram of a ninth embodiment of a POE system.

FIG. 9 is a circuit diagram of a ninth embodiment of a POE system 1h. In the embodiment, a fixed state detection circuit 202b is similar to the fixed state detection circuit 202a of the fifth embodiment. The difference between the fixed state detection circuit 202b and the fixed state detection circuit 202a is that the fixed state detection circuit 202b only comprises the first comparators C11, C12, C13 and the reference voltage signals Vref1, Vref2, Vref3. The output terminals of the first comparators C11, C12, C13 are connected to the MCU U1, and the fixed state detection circuit 202b outputs the first control signals according to the comparison signals output by the first comparators C11, C12, C13. The AD converter U2 converts the second sampling voltage signals output by the amplifier A1 into the second control signals, and sends to the MCU U1. The MCU U1 gains the maximum power of the network device 30 according to the second control signals, and outputs the third control signals to control a part of POE ports to turn off to avoid unnecessary power signals being supplied by POE ports.

Figure 10:
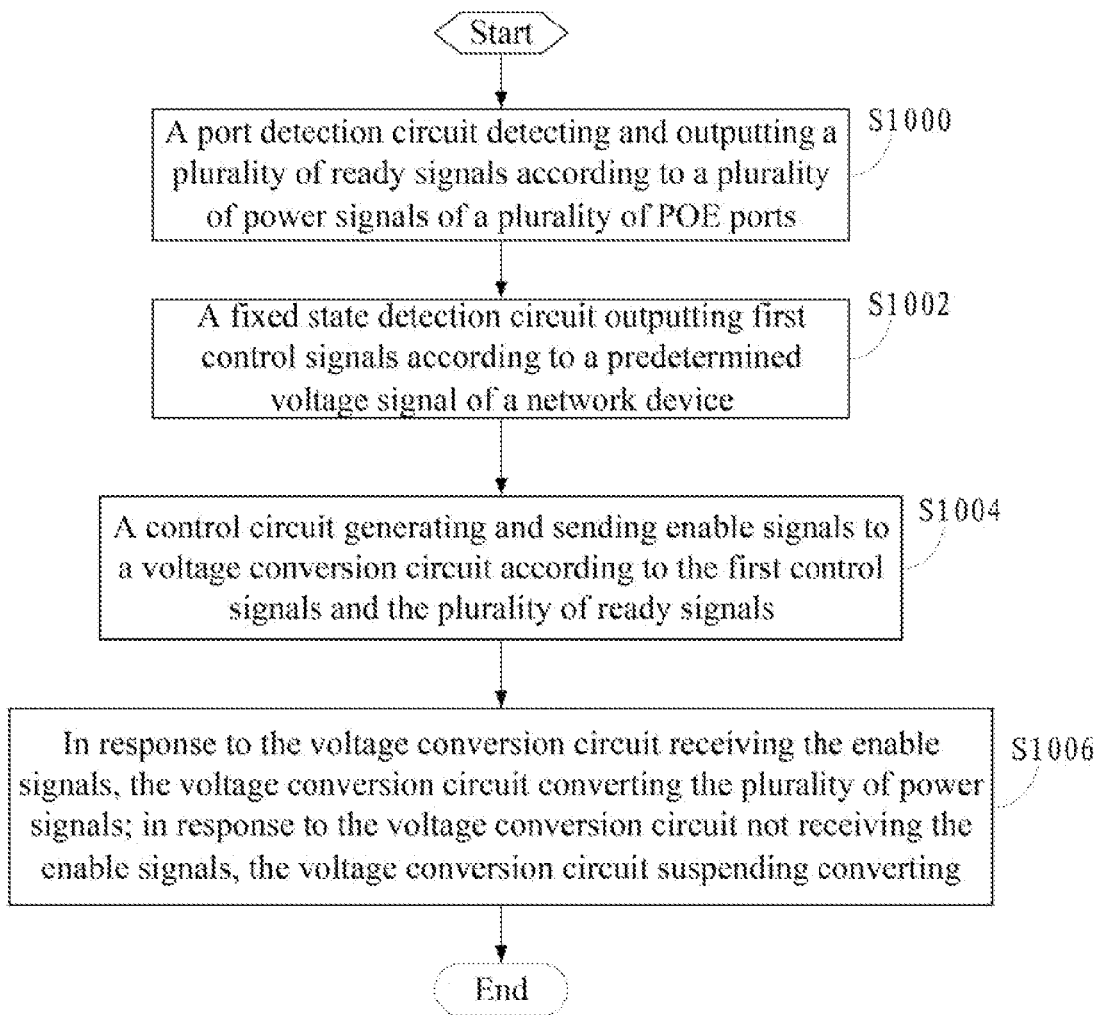
FIG. 10 is a flowchart of a first embodiment of a POE control method.

FIG. 10 is a flowchart of a first embodiment of a POE control method. In block S1000, the port detection circuit 200 detects and outputs the plurality of ready signals according to the plurality of power signals of the POE ports 10a, 10b, 10c, 10d. In block S1002, the fixed state detection circuit 202 outputs the first control signals according to the predetermined voltage signal of the network device 30. In block S1004, the control circuit 206 generates and sends the enable signals to the voltage conversion circuit 204 according to the first control signals and the plurality of ready signals. In block S1006, the voltage conversion circuit 204 converts the plurality of power signals according to whether the voltage conversion circuit 204 receives the enable signal from the control circuit 206.I In response to the voltage conversion circuit 204 receiving the enable signals, the voltage conversion circuit converts the plurality of power signals, and in response to the voltage conversion circuit 204 not receiving the enable signals, the voltage conversion circuit 204 suspends converting.

Figure 11:
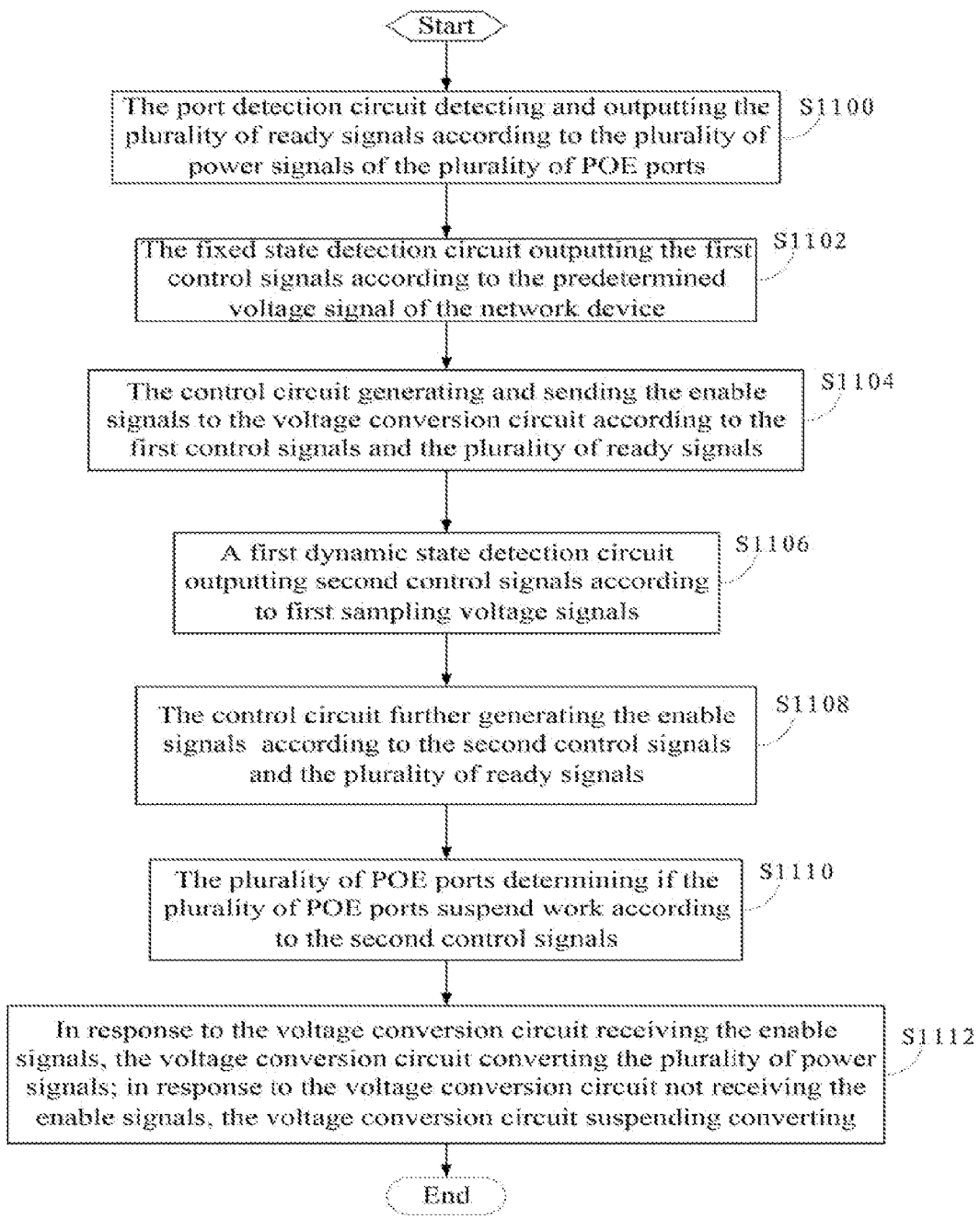
FIG. 11 is a flowchart of a second embodiment of a POE control method.

FIG. 11 is a flowchart of a second embodiment of a POE control method. In the embodiment, blocks S1100, S1102, S1104, S1112 are similar to blocks S1000, S1002, S1004, S1006 of the first embodiment, correspondingly. In block S1106, the first dynamic state detection circuit 210 outputs the second control signals according to the first sampling voltage signals output by the sampling circuit 208. In block S1108, the control circuit 206 further generates the enable signals according to the second control signals output by the first dynamic state detection circuit 210 and the plurality of ready signals output by the port detection circuit 200. In block S1110, the POE ports 10a, 10b, 10c, 10d determines if the POE ports 10a, 10b, 10c, 10d suspends work according to the second control signals output by the first dynamic state detection circuit 210.

Figure 12:
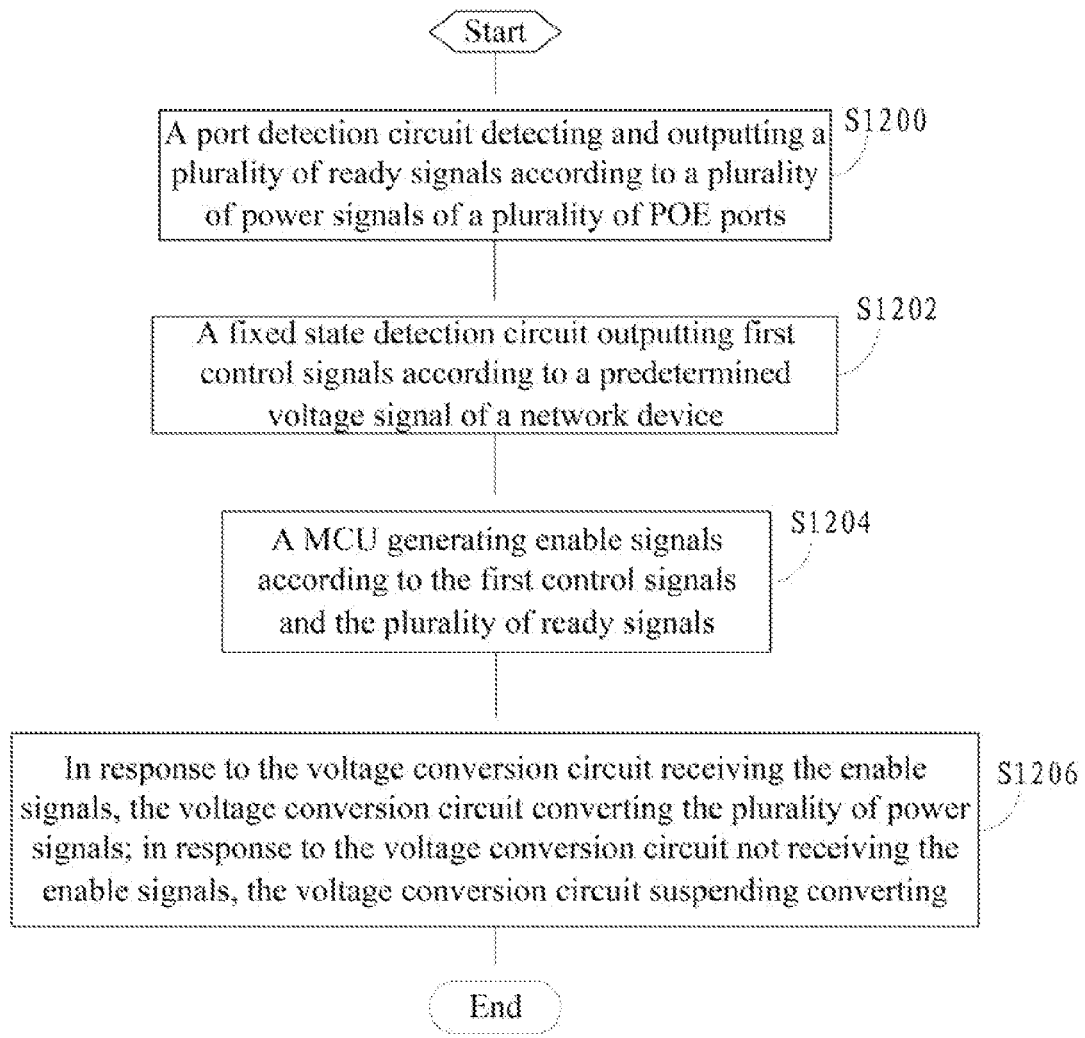
FIG. 12 is a flowchart of a third embodiment of a POE control method.

FIG. 12 is a flowchart of a third embodiment of a POE control method. In the embodiment, blocks S1200, S1202, S1206 are similar to blocks S1000, S1002, S1006 of the first embodiment, respectively. In block S1204, the MCU U1 generates the enable signals according to the first control signals and the plurality of ready signals.

Figure 13:
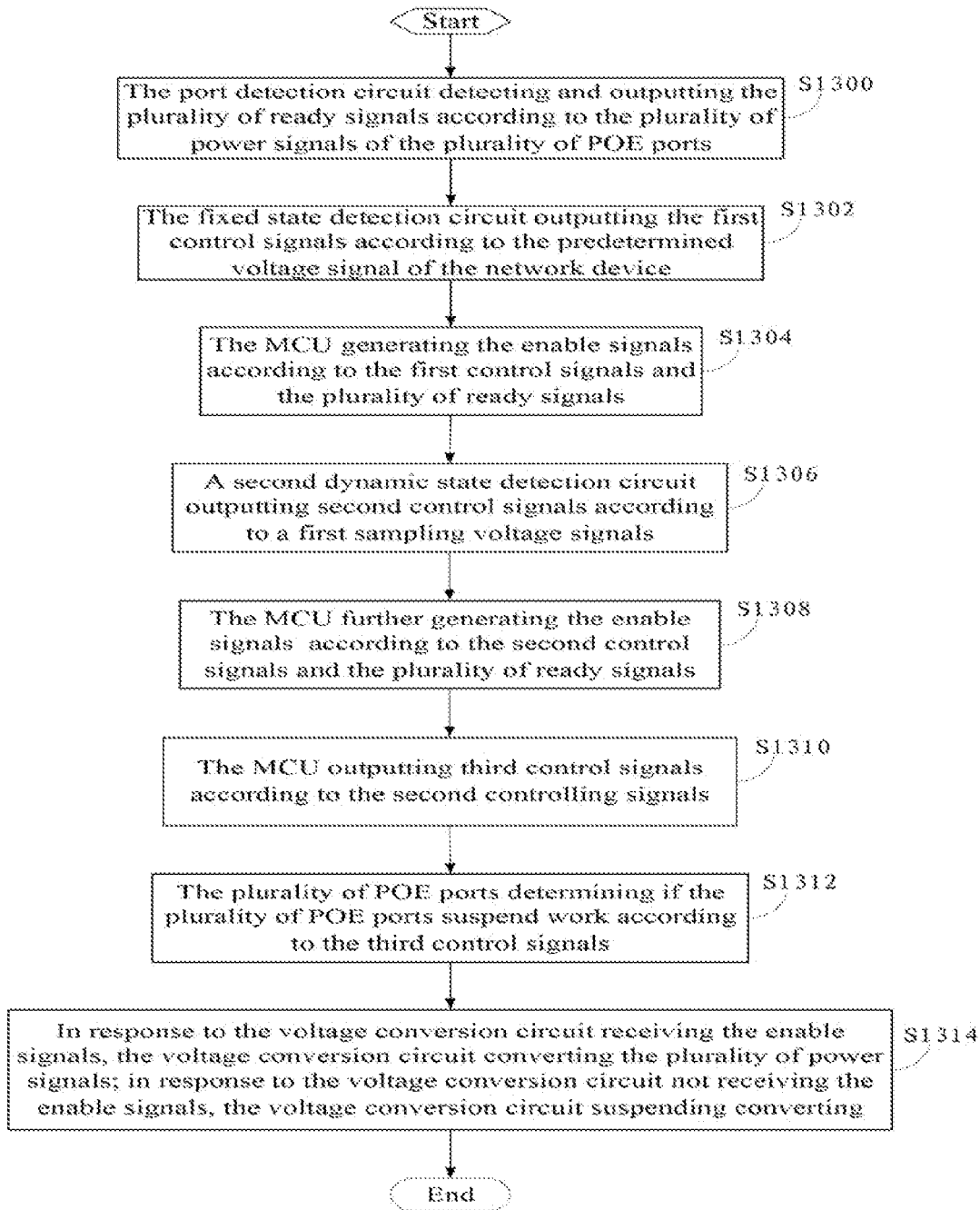
FIG. 13 is a flowchart of a fourth embodiment of a POE control method.

FIG. 13 is a flowchart of a fourth embodiment of a POE control method. In the embodiment, blocks S1300, S1302, S1314 are similar to blocks S1000, S1002, S1006 of the first embodiment, respectively, and block S1304 is similar to block S1204 of the third embodiment. In block S1306, the second dynamic state detection circuit 212 outputs the second control signals according to the first sampling voltage signals output by the sampling circuit 208. In block S1308, the MCU U1 further generates the enable signals according to the second control signals output by the second dynamic state detection circuit 212 and the plurality of ready signals output by the port detection circuit 200. In block S1310, the MCU U1 outputs the third control signals according to the second control signals output by the second dynamic state detection circuit 212. In block S1312, the POE 10a, 10b, 10c, 10d ports determines if the POE ports 10a, 10b, 10c, 10d suspend work according to the third control signals.

The foregoing disclosure of various embodiments has been presented for the purposes of illustration. It is not intended to be exhaustive or limited to the precise forms disclosed. Many variations and modifications of the embodiments described herein will be apparent to one of ordinary skill in the art in the light of the above disclosure. The scope is to be defined only by the claims appended hereto and their equivalents.

What is claimed is:

1. A redundant power supply circuit comprising:
a port detection circuit connected to a plurality of power over Ethernet (POE) ports, the port detection circuit detecting and outputting a plurality of ready signals according to a plurality of power signals output by the plurality of POE ports;
a fixed state detection circuit outputting first control signals according to a predetermined voltage signal of a network device;
a voltage conversion circuit connected between the plurality of POE ports and the network device, the voltage conversion circuit converting the plurality of power signals into driving voltage signals to drive the network device; and
a control circuit receiving the first control signals from the fixed state detection circuit, and the plurality of ready signals from the port detection circuit, the control circuit generating and sending enable signals to the voltage conversion circuit according to the first control signals and the plurality of ready signals;
wherein the voltage conversion circuit determines whether the plurality of power signals are converted into the driving voltage signals according to whether the voltage conversion circuit receives the enable signal from the control circuit.

2. The redundant power supply circuit of claim 1, wherein the predetermined voltage signal is determined by a theoretical power of the network device.

3. The redundant power supply circuit of claim 2, wherein the fixed state detection circuit comprises:
a first comparison circuit comparing the predetermined voltage signal with a plurality of reference voltage signals to output the first control signal, the first comparison circuit comprising a plurality of first comparison units; and
an first isolation circuit with a first terminal connected to the first comparison circuit, and a second terminal connected to a node between the port detection circuit and the control circuit, the isolation circuit isolating the first comparison circuit from the port detection circuit so that the port detection circuit can transmit the plurality of ready signals to the control circuit, the isolation circuit comprising a plurality of isolation units;
wherein each of the first comparison units is respectively connected to each of the isolation units.

4. The redundant power supply circuit of claim 3, wherein the number of the first comparison units is one less than the number of the POE ports, the plurality of power signals output by the plurality of POE ports have a plurality of power levels, and each of the reference voltage signals corresponds to each of the power levels.

5. The redundant power supply circuit of claim 4, wherein each of the first comparison units compares the predetermined voltage signal with the reference voltage signal corresponding to each of the power levels to output comparison signals, and the first control signal comprises the plurality of comparison signals output by the plurality of first comparison units.

6. The redundant power supply circuit of claim 1, further comprising a sampling circuit connected to the voltage conversion circuit, wherein the sampling circuit samples current signals flowing through the voltage conversion circuit to output first sampling voltage signals.

7. The redundant power supply circuit of claim 6, wherein the current signals sampled by the sampling circuit are current signals flowing through the network device in a full load state.

8. The redundant power supply circuit of claim 6, further comprising a dynamic state detection circuit connected to the sampling circuit, the control circuit, and the plurality of POE ports, wherein the dynamic state detection circuit outputs second control signals according to the first sampling voltage signals output by the sampling circuit, the control circuit further generates the enable signals according to the second control signals and the plurality of ready signals, and the plurality of POE ports further determine if the plurality of POE ports suspend work according to the second control signals.

9. The redundant power supply circuit of claim 8, wherein in response to the voltage conversion circuit receiving the enable signals, the voltage conversion circuit converts the plurality of power signals to the driving voltage signals to drive the network device; in response to the voltage conversion circuit not receiving the enable signals, the voltage conversion circuit suspends converting.

10. The redundant power supply circuit of claim 8, wherein the dynamic state detection circuit comprises:
an amplification circuit amplifying the first sampling voltage signals output by the sampling circuit into second sampling voltage signals;
a second comparison circuit comparing the second sampling voltage signals with a plurality of reference voltage signals to output the second control signals, the second comparison circuit comprising a plurality of second comparison units;
a temporary signal storage circuit receiving and storing the second control signals, the temporary signal storage circuit comprising a plurality of temporary signal storage units;
an isolation circuit with a first terminal connected to the temporary signal storage circuit, a second terminal connected to a node between the port detection circuit and the control circuit, the isolation circuit isolating the temporary signal storage circuit from the port detection circuit so that the port detection circuit can transmit the plurality of ready signals to the control circuit, the isolation circuit comprising a plurality of isolation units; and a switch circuit connected to the temporary signal storage circuit, the switch circuit outputting a plurality of suspending signals according to the second control signals, the switch circuit comprising a plurality of switch units;

wherein the plurality of POE ports determine if the plurality of POE ports suspend work according to the plurality of suspending signals.

11. The redundant power supply circuit of claim 10, wherein the number of the second comparison units is one less than the number of the POE ports, the plurality of power signals output by the plurality of POE ports have a plurality of power levels, and each of the reference voltage signals corresponds to each of the power levels.

12. The redundant power supply circuit of claim 11, wherein the control circuit comprises a plurality of AND gates, and in response to a value of supplied power of the plurality of POE ports not being less than a value of the theoretical power of the network device, the plurality of AND gates output the enable signals.

13. The redundant power supply circuit of claim 11, wherein each of the second comparison units compares the second sampling voltage signals with the reference voltage signal corresponding to each of the power levels to output comparison signals, and the second control signals comprise the plurality of comparison signals output by the plurality of second comparison units.

14. The redundant power supply circuit of claim 13, wherein each of the switch units outputs the suspending signals according to the comparison signal output by each of the second comparison units.

15. The redundant power supply circuit of claim 14, wherein in response to the POE port receiving the suspending signals, the POE port suspends work, and a voltage of the power signals output by the POE port is zero.

16. The redundant power supply circuit of claim 6, wherein the control circuit comprises a micro control unit (MCU).

17. The redundant power supply circuit of claim 16, further comprising a dynamic state detection circuit connected to the sampling circuit and the MCU, wherein the dynamic state detection circuit outputs second control signals according to the first sampling voltage signals output by the sampling circuit, and the MCU further generates the enable signals according to the second control signals and the plurality of ready signals.

18. The redundant power supply circuit of claim 17, wherein the MCU is further connected to the plurality of POE ports, the MCU outputs third control signals according to the second control signals, and the plurality of POE ports further determine if the plurality of POE ports suspend work according to the third control signals.

19. The redundant power supply circuit of claim 17, wherein the dynamic state detection circuit comprises:

an amplification circuit amplifying the first sampling voltage signals output by the sampling circuit into second sampling voltage signals; and an analog digital (AD) converter outputting the second control signals according to the second sampling voltage signals.

20. A POE system comprising:
a plurality of POE ports;
a network device; and
a redundant power supply circuit comprising:
a port detection circuit connected to a plurality of POE ports, the port detection circuit detecting and outputting a plurality of ready signals according to a plurality of power signals output by the plurality of POE ports;
a fixed state detection circuit outputting first control signals according to a predetermined voltage signal of a network device;
a voltage conversion circuit connected between the plurality of POE ports and the network device, the voltage conversion circuit converting the plurality of power signals into driving voltage signals to drive the network device; and
a control circuit receiving the first control signal from the fixed state detection circuit, and the plurality of ready signals from the port detection circuit, the control circuit generating and sending enable signals to the voltage conversion circuit according to the first control signals and the plurality of ready signals;
wherein the voltage conversion circuit determines whether the plurality of power signals are converted into the driving voltage signals according to whether the voltage conversion circuit receives the enable signal from the control circuit.

21. A POE method used in a redundant power supply circuit, the redundant power supply circuit comprising a port detection circuit, a fixed state detection circuit, a voltage conversion circuit, and a control circuit, the POE method comprising:

detecting and outputting a plurality of ready signals with the port detection circuit according to a plurality of power signals of a plurality of POE ports;

outputting first control signals with the fixed state detection circuit according to a predetermined voltage signal of a network device;

generating and sending enable signals with the control circuit to the voltage conversion circuit according to the first control signals and the plurality of ready signals; and converting the plurality of power signals with the voltage conversion circuit according to whether the voltage conversion circuit receives the enable signal from the control circuit.

22. The POE method of claim 21, wherein the redundant power supply circuit further comprises a sampling circuit and a dynamic state detection circuit, the sampling circuit samples current signals flowing through the voltage conversion circuit to output first sampling voltage signals, the dynamic state detection circuit outputs second control signals according to the first sampling voltage signals, and the block of generating and sending the enable signals comprises:

generating and sending the enable signals with the control circuit to the voltage conversion circuit according to the first control signals and the plurality of ready signals; and generating and sending the enable signals with the control circuit to the voltage conversion circuit according to the second control signals and the plurality of ready signals.

23. The POE method of claim 22, wherein the block of outputs the second control signals further comprises:
   determining with the plurality of POE ports if the plurality of POE ports suspend work according to the second control signals.

24. The POE method of claim 21, wherein the control circuit comprises a MCU, and the block of generating and sending the enable signals comprises:
   generating and sending the enable signals with the MCU to the voltage conversion circuit according to the first control signals and the plurality of ready signals.

25. The POE method of claim 24, wherein the redundant power supply circuit further comprises a sampling circuit and a dynamic state detection circuit, the sampling circuit samples current signals flowing through the voltage conversion circuit to output first sampling voltage signals, the dynamic state detection circuit outputs second control signals according to the first sampling voltage signals, and the block of generating and sending the enable signals further comprises:
   generating and sending the enable signals with the MCU to the voltage conversion circuit according to the second control signals and the plurality of ready signals.

26. The POE method of claim 25, wherein the block of generating and sending the enable signals further comprises:
   outputting third control signals with the MCU according to the second control signals;
   determining with the plurality of POE ports if the plurality of POE ports suspend work according to the third control signals.

27. The POE method of claim 21, wherein the block of converting the plurality of power signals comprises:
   converting the plurality of power signals with the voltage conversion circuit to the driving voltage signals to drive the network device, in response to the voltage conversion circuit receiving the enable signals;
   suspending converting with the voltage conversion circuit, in response to the voltage conversion circuit not receiving the enable signals.

\* \* \* \* \*